April 28, 1970 W. E. HENDERSON ET AL 3,508,944
BIAXIALLY ORIENTED LINEAR HIGHLY CRYSTALLINE POLYOLEFIN
FILM COATED WITH A POLYOLEFIN COATING
Original Filed Oct. 24, 1962 2 Sheets-Sheet 1

INVENTORS
WILLIAM E. HENDERSON
GERALD R. TOY
WILLIAM SACKS
BY
John F. Hofmann
ATTORNEY

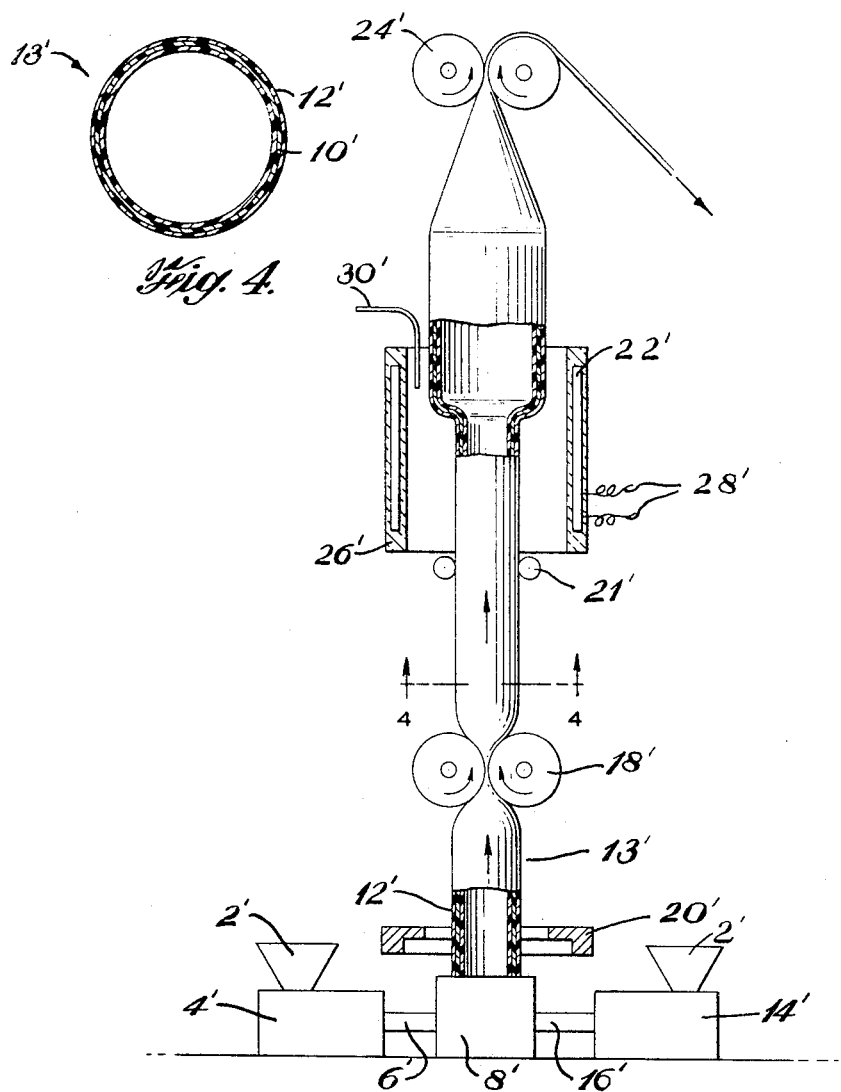

3,508,944
BIAXIALLY ORIENTED LINEAR HIGHLY CRYSTALLINE POLYOLEFIN FILM COATED WITH A POLYOLEFIN COATING
William E. Henderson, Hinsdale, Ill., and Gerald R. Toy, Basking Ridge, and William Sacks, Gillette, N.J., assignors to Union Carbide Corporation, a corporation of New York
Original application Oct. 24, 1962, Ser. No. 232,716. Divided and this application Feb. 14, 1966, Ser. No. 600,673
Int. Cl. B05c 3/12; B29d 7/24
U.S. Cl. 117—7                                         7 Claims

ABSTRACT OF THE DISCLOSURE

This invention relates to a film, which is particularly useful as a packaging material, comprising a biaxially oriented linear highly crystalline polyolefin film such as polypropylene, and a coating of a polyolefin such as low density polyethylene bonded to at least one surface thereof. The polyolefin coating, which has a melting point of at least about 5° C., preferably 20 to 90° C., below the melting point of the highly crystalline film, can be heat-sealed to itself at a temperature below the temperature at which shrinking and puckering of the biaxially oriented film occurs.

---

The coated biaxially oriented film can be produced by simultaneously melt extruding a tube of a linear highly crystalline polyolefin from an annular orifice and coating at least one side of the highly crystalline film with a polyolefin with a lower melting point extruded from a concentric annular orifice, and thereafter biaxially stretching the coated film at a temperature above the draw point of the highly crystalline film and the melting point of the coating and below the melting point of the highly crystalline film with the result that only the highly crystalline film is biaxially oriented.

This application is a division of our copending application Ser. No. 232,716, filed Oct. 24, 1962 which is now abandoned.

This invention relates to coated biaxially oriented linear, highly crystalline polyolefin films and to a method of forming the same. More particularly, this invention relates to a method of forming biaxially oriented linear highly crystalline polypropylene film coated with low density polyethylene.

With the advent of new polymerization techniques, such as the so-called low pressure polymerization techniques, it has become possible to polymerize olefins, such as ethylene and propylene, to produce polymeric molecules arranged in a specific or definite order. Such polymers are characterized by greater linearity, high crystallinity, higher melting points and higher densities than heretofore possible. Linear, highly crystalline high density polyethylene, that is, polyethylene having a density of at least 0.94 gram per cubic centimeter and a crystalline content of at least about 70 percent by weight, and linear, highly crystalline polypropylene, that is, polypropylene having an isotactic content of at least about 57 percent by weight and a crystalline content of at least about 55 percent by weight, are illustrative of such linear crystalline polyolefins.

Recently, it has been discovered that the linear, high crystalline polyolefins in the form of film can be biaxially stretched to produce self-supporting linear highly crystalline polyolefin films having improved physical properties, i.e. greater tensile strengths, greater stiffness, greater impact strength and better optical properties, than unoriented films of the same materials. Such properties of biaxially oriented linear highly crystalline polyolefin films make them highly desirable for use in many packaging applications. A common disadvantage of such biaxially oriented linear, highly crystalline films, however, is that at temperatures required to heat seal these films, shrinkage and puckering occurs at the heat seal area, thereby detracting from the appearance of the film.

Accordingly, it is an object of the present invention to provide a biaxially oriented linear highly crystalline polyolefin film having a polyolefin coating thereon heat-sealable at temperatures below the temperature at which shrinkage and puckering of the biaxially oriented linear highly crystalline polyolefin film occurs.

Another object of the present invention is to provide a biaxially oriented linear highly crystalline polypropylene film having a low density polyethylene coating thereon heat-sealable at temperatures below the temperature at which shrinkage and puckering of the biaxially linear highly crystalline polypropylene film occurs.

The objects of the present invention are accomplished in general by coating a linear, highly crystalline, polyolefin film with a polyolefin material having a lower melting point than the linear, highly crystalline polyolefin, and thereafter stretching the polyolefin-coated linear highly crystalline polyolefin film in both the longitudinal and transverse directions at a temperature below the melting point of the linear highly crystalline polyolefin and above its draw point, and above the melting point of the polyolefin coating and below its decomposition or degradation temperature. The polyolefin coating should have a melting point of at least about 5° C. below, preferably 20 to 90° C. below, that of the linear, highly crystalline polyolefin. For polypropylene film, a coating consisting of polyethylene having a density less than 0.94 and a melting point less than 125° C. is preferred.

Low density polyethylene coated biaxially oriented linear highly crystalline polyolefin films thereby formed can now be heat sealed without shrinkage or puckering by contacting the lower melting polyethylene coating with lower melting polyethylene coating, and heat sealing at temperatures below the temperature at which puckering and shrinkage of the biaxially oriented linear highly crystalline film occurs.

One method of coating the linear highly crystalline polyolefin film, and particularly linear highly crystalline polypropylene film with low density polyethylene, is by melt-extruding low density polyethylene through an annular orifice and concurrently depositing thereon a melt of a linear highly crystalline polyolefin sumultaneously and concentrically extruded from another annular orifice to form seamless tubing having a layer of low density polyethylene coating and a layer of a linear highly crystalline polypropylene film. The seamless tubing is continuously withdrawn and constricted at a point spaced from the point of extrusion. A bubble of fluid medium is maintained in the tubing between the point of extrusion and the point of constriction to distend the tubing to the desired diameter. Near the point of extrusion the seamless tubing is passed through a fluid medium of such temperature as to cool the layers of seamless tubing to an extent that when the tubing has been inflated by said bubble to the desired diameter, it will be in a set condition. At this stage of the process, it has been found that the layer of low density polyethylene coating has negligible adherence to the layer of linear highly crystalline polypropylene film and can be readily separated or peeled therefrom.

Unexpectedly, it has been discovered that excellent adhesion between the low density polyethylene coating and linear highly crystalline polypropylene film of the seamless tubing, thusly formed, is obtained by heating the composite tubing to a temperature below the melting point of the linear highly crystalline polypropylene and above its draw point, and above the melting point of the low density polyethylene and below its degradation temperature; and expanding the seamless tubing by maintaining therein a constant continuous isolated bubble of a fluid medium under pressure, thereby effecting biaxial stretching and orientation of the linear highly crystalline polypropylene film and bonding the low density polyethylene coating to said biaxially oriented linear highly crystalline polypropylene film.

The nature of the invention and the manner in which it can be practiced will become clear from the detailed description when taken in conjunction with the accompanying drawings forming the specification and wherein:

FIG. 3 is a side elevation, schematically showing one form of apparatus for continuously melt-extruding and biaxially orienting linear highly crystalline polyolefin film coated on both surfaces with low density polyethylene;

FIG. 4 is an exaggerated cross-section of the composite tubing taken on the line 3—3 of FIG. 3.

Figures 1, 2:
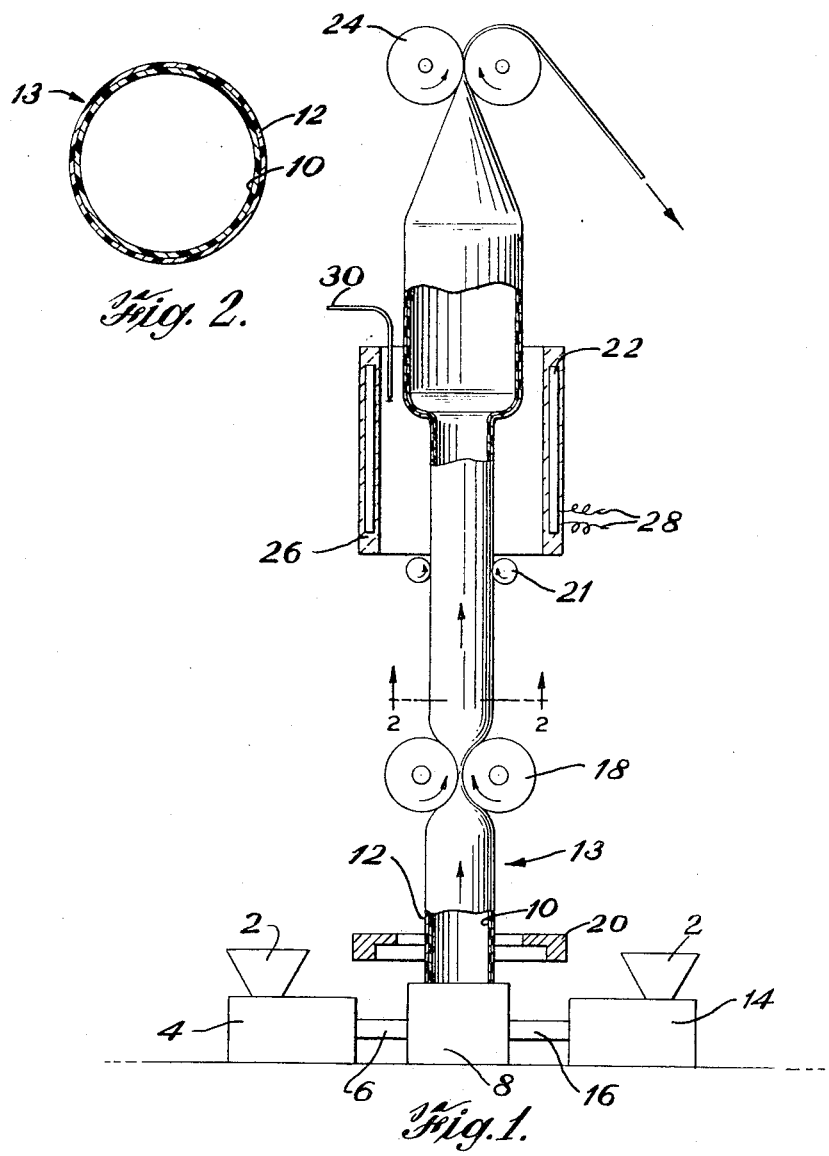
FIG. 1 is a side elevation, schematically showing one form of apparatus for continuously melt-extruding and biaxially orienting a linear highly crystalline polyolefin film coated on one surface with low density polyethylene.
FIG. 2 is an exaggerated cross-section of the composite tubing taken on line 2—2 of FIG. 1.

Referring to FIGS. 1 and 2, a linear highly crystalline film-forming olefin polymer, such as linear highly crystalline polypropylene, is fed through a hopper 2 into a conventional extruder 4 wherein it is heated to an appropriate melt extrusion temperature, e.g. 50 to 70° C. above the melting point of the polymer. The molten polymer is fed through the extruder 4 into a conduit 6 secured to the extruder 4 and thence through the inner annular orifice of a double orifice die 8 connected to the conduit 6 and from which the polymer issues in the form of a seamless tubing 10. Conjointly and simultaneously therewith, an olefin polymer having a melting point of at least about 5° C. below that of the linear highly crystalline olefin polymer, such as low density polyethylene, is fed through a hopper 2 into a conventional extruder 14 wherein it is heated to an appropriate melt extrusion temperature, e.g. 50 to 70° C. above the melting point of the polymer. The molten polymer is fed through the extruder 14 into a conduit 16 secured to the extruder 14, and thence through the outer annular orifice of the double orifice die 8 connected to the conduit 16 and from which said molten polymer is issued in the form of a seamless tubing 12 contiguous to and surrounding the tubing 10, thus forming a seamless multi-walled tubing 13. An exaggerated cross-section of the composite tubing 13 taken on line 2—2 of FIG. 1 is shown in FIG. 2. A bubble of air is maintained within the multi-walled tubing 13 to distend the tubing 13 to its desired diameter. The multi-walled tubing 13 is drawn vertically upward from the die 8 by a pair of take-away counter rotating squeeze rolls 18 and through a cooling zone 20 (such as that described in U.S. Patent No. 2,461,975) which serves to chill and set the expanding seamless multi-wall tubing 13 at a point where it has reached the desired diameter. The set seamless multi-wall tubing 13 is then flattened by the squeeze rolls 18 upon passage through the nip thereof.

Undesirably, it has been found that insufficient adhesion exists between the unoriented linear highly crystalline polypropylene tubing 10 and the outer low density polyethylene tubing 12, with the result that one tubing can be readily separated or peeled from the other. Surprisingly, excellent adhesion between the seamless tubes 10 and 12 can be obtained by drawing the flattened concentric seamless tubes 10, 12 from the squeeze rolls 18 vertically upward between guide rolls 21 and through a heating device 22 by a pair of take-away counter rotating squeeze rolls 24. The heater 22 heats the seamless linear highly crystalline polypropylene tubing 10 to a temperature above which the film becomes drawable and orients when stretched, but below which the film merely thins out when stretched without appreciable orientation, and preferably to a temperature from about 5° to 35° C. below its melting point as determined by the temperature at which the film loses birefringence as measured by observation between crossed Nichols on a hot state microscope. The heater 22 also heats the seamless low density polyethylene tubing 12 to a temperature above the melting point of the low density polyethylene and below its degradation temperature. Simultaneously, a bubble of air or other fluid inert to the polymers of the tubes 10 and 12 is maintained within the multi-wall tubing 13 between the squeeze rolls 18 and 24 to distend and stretch the thusly heated linear highly crystalline polypropylene tubing 10 radially to the desired extent. The concentric tubes 10, 12 are then flattened by passage from the driven squeeze rolls 24. The peripheral speed of squeeze rolls 24 is greater than that of the squeeze rolls 18 to pick up any slack formed in the multi-wall tubing 13 during biaxial stretching of the linear highly crystalline polypropylene tubing 10 and to impart additional machine direction stretch to said tubing 10. Thus, desired orientation of the film is had along the axis of its passage from the apparatus between squeeze rolls 18 and 24 (machine direction) as well as transversely thereto (transverse direction) while effecting excellent adhesion between the tubes 10 and 12.

Tubular low density polyethylene-coated linear highly crystalline polypropylene film as made by the herein described double-wall technique, when slit into sheets, gives biaxially oriented linear highly crystalline polypropylene film coated with low density polyethylene on one film surface. Such sheets can be heat-sealed to each other by contacting the lower melting low density, polyethylene coating of one sheet with the low density polyethylene coated surface of the other. The temperatures necessary for heat-sealing the contacting low density polyethylene coatings are below that temperature necessary for heat-sealing contacting biaxially oriented linear highly crystalline polypropylene film to polypropylene film. Thus, by heat-sealing the contacting low density polyethyene coating at the lower heat-sealing temperature, shrinkage and puckering of the biaxially oriented linear highly crystalline polypropylene film is avoided.

It has been found that at the temperatures for heat-sealing the low density polyethylene coating, the low density polyethylene coating does not heat-seal very effectively to an uncoated biaxially oriented linear highly crystalline polypropylene film surface. Moreover, due to the clarity of the films, it can become difficult to determine by unaided visual inspection which film surface of the biaxially oriented linear highly crystalline polypropylene film is coated with the low density polyethylene coating. Accordingly, it is often advantageous that both film surfaces of the polypropylene film be coated with low density polyethylene coating and biaxially oriented as, for example, by the apparatus illustrated in FIG. 3, and wherein like reference numerals are used to designate elements similar to those shown in FIG. 1, except that a prime (') is used after the numerals.

As illustrated in FIGS. 3 and 4, tubular linear highly crystalline polypropylene film 10' is melt-extruded by extruder 4' through conduit 6' and thence through the center orifice of a circular triple orifice die 8' and conjointly and simultaneously therewith, low density polyethylene coatings 12' are melt-extruded from extruder 14' through conduit 16' and thence through both the innermost and outermost orifices of the die 8' adjacent to and in direct contact with the linear highly crystalline polypropylene film 10' to form seamless triple-wall tubing 13'. An exaggerated cross section of the composite tubing 13' taken on line 4—4 of FIG. 3 is shown in FIG. 4. As in the embodiment shown in FIG. 1, a bubble of air is maintained within the triple-walled tubing 13' so as to distend the tubing 13' to the desired diameter. The triple-walled tubing 13' is then passed through a cooling ring 20' to set the polymeric materials, and thereafter, the triple-wall tubing 13' is flattened by squeeze rolls 18' which also serve to maintain the air bubble within the tubing 13'. Undesirably, it has been found that insufficient adhesion exists between the low density polyethylene coatings 12' and the unoriented linear highly crystalline polypropylene film 10' with the result that the low density polyethylene coatings 12' readily separated or peeled from the unoriented polypropylene film 10'.

Surprisingly and unexpectedly, however, when such triple-walled tubing 13' is drawn vertically upward through the heater 22' by the squeeze rolls 24' and subjected to the temperature and pressure limitations hereinbefore described, biaxially oriented linear highly crystalline polypropylene film is obtained which excellently adheres to the low density polyethylene coatings. More particularly, the heater 22' heats the linear highly crystalline polypropylene tubing 10' to a temperature above which the tubing 10' becomes drawable and orients when stretched, but below which the tubing 10' merely thins out when stretched without appreciable orientation, and preferably to a temperature from about 5° to 35° C. below the temperature at which the tubing loses birefringence as measured by crossed Nichol prisms on a hot stage microscope, while concurrently heating the low density polyethylene coatings 12' to a temperature above the melting point of the low density polyethylene but below its degradation temperature. Simultaneously, a bubble of air is maintained within the seamless multi-wall tubing 13' between the squeeze rolls 18' and 24' to distend and stretch the linear, highly crystalline polypropylene tubing 10' radially to the desired extent. The multi-wall tubing 13' is then flattened by passage through the squeeze rolls 24'. The peripheral speed of the squeeze rolls 24' as in FIG. 1, is greater than that of squeeze rolls 18' to pick up any slack formed in the multi-wall tubing 13' during the biaxial stretching of the linear highly crystalline polypropylene tubing 10' and to impart additional machine direction stretch to said tubing 10'.

The heater 22 and 22' of FIGS. 1 and 3, respectively, comprises at least one heating element such as an electrical resistant heater mounted in a suitable tubular support 26 or 26' of FIGS. 1 and 3, respectively which may conveniently be glass or ceramic material to which electrical current from a source (not shown) is carried thereto and therefrom by wires 28 or 28'. The internal diameter of the tubular support 26 or 26' is sufficiently large to allow the tubing in its inflated condition to pass therethrough with clearance. The measured temperatures used in the process are obtained by means of a thermocouple illustratively shown by thermocouple 30 to 30' placed in the heating device and held in contact with the outside surface of the seamless tubing at its draw point. Of course, other means of heating such as infra-red, hot air, dielectric heating and steam for example can be also employed in the described process.

It is to be noted that the factors affecting the amount of stretch and orientation of the linear, highly crystalline polyolefin tubing of either embodiment in general, includes the ratio of peripheral speeds of squeeze rolls 18 or 18' to squeeze rolls 24 or 24' commonly called the draw ratio; the temperature to which the linear, highly crystalline polyolefin tubing is subjected and the internal pressure of the bubble of air in the tubing. Furthermore, in its passage through the heating device, the linear highly crystalline polyolefin tubing becomes drawable and radially expands at a well-defined point herein referred to as the draw point. The height axis of the draw point will tend to rise upwardly in the heating device if the temperature is lowered or if the linear velocity of the tubing through the heater is increased. Conversely, the height of the draw point will be lowered if the temperature is raised or the linear velocity of the film through the heater is decreased.

The multi-wall film of the present invention can be melt-extruded into seamless tubing followed by biaxial orientation of the tubular linear highly crystalline polyolefin film in a continuous method as herein described, or if desired, the melt-extruded seamless multi-wall tubular film can be wound upon a reel and the biaxial orientation of the linear high crystalline polyolefin film can be carried out at some subsequent time. The multi-wall film of the present invention can also be formed by the slot extrusion method, and thereafter the low density polyethylene coated linear highly crystalline film can be stretched at a temperature below the melting point of the linear highly crystalline polyolefin and above its draw point, and above the melting point of the low density polyethylene and below its degradation temperature.

Furthermore, the low density polyethylene coating can be applied to the linear highly crystalline polyolefin by other methods such as applying the low density polyethylene as an emulsion composition, as a solvent composition, preforming the low density polyethylene coating into a film and thereafter laminating it to the linear, highly crystalline polyolefin film, as well as coating the linear highly crystalline polyolefin film with low density polyethylene by the extrusion coating method. Also, the coated film may be annealed to further improve its sealing characteristics.

Film-forming linear highly crystalline olefin polymers which can be used in the present invention include film-forming polypropylene desirably having a crystalline content of at least about 55 percent by weight of polypropylene. In addition, such film-forming polypropylene has an isotactic content of about 57 to 82 percent by weight of polypropylene and preferably a complementary atactic content of about 43 to 18 percent by weight of polypropylene, respectively. Desirably, for clarity and see-through transmission, the linear highly crystalline biaxially oriented polypropylene films of the present invention are formed from film-forming polypropylene having an isotactic content of about 70 to 80 percent by weight of polypropylene, an atactic content of about 30 to 20 percent by weight of polypropylene. In addition to the relationship of isotactic to atactic content in a film-forming polypropylene, to further facilitate the obtaining of biaxially oriented films with improved properties, it is preferred to employ film-forming polypropylene having a melt index of at least about 0.8 and optimumly from about 0.8 to 2.7; an intrinsic viscosity of at least 1.3 and optimumly from about 2.85 to 3.18; and a density of at least about 0.88 and optimumly from about 0.90 to 0.905. Biaxially oriented polypropylene film having these optimum properties and having an isotactic content of from about 70 to 80 percent by weight of polypropylene, respectively, have superior optical properties, such as clarity and see-through transmission.

Other film-forming linear highly crystalline olefin polymers which also can be used in the present invention include high density polyethylene, i.e. polyethylene having a crystalline content of at least about 70 percent by weight of polyethylene and a density of 0.94 and above, film-forming polybutene, mixtures of high density polyethylene and highly crystalline polypropylene, and linear highly crystalline copolymers of ethylene, propylene and butene. Film-forming linear highly crystalline olefin polymers can also be prepared by polymerizing ethylene and/or propylene with other polymerizable monomeric olefins such as vinyl chloride and vinyl acetate.

The heat-sealable polyolefin coatings used in the present invention have a melting point of at least about 5° C. below that of the linear highly crystalline polyolefin film to which it is applied and include low density polyethylene coatings having a density of less than 0.94 and which can be prepared by polymerizing ethylene by the conventional high pressure techniques. Other monomers in small amounts such as propylene, isobutylene, acrylic acid, methacrylic acid and their esters, styrene and the like can also be copolymerized with the ethylene. The low density polyethylene need not necessarily be of a type to form self-sustaining films since it is used primarily as a coating. Low molecular weight low density polyethylenes such as polyethylene waxes, can also be used.

The polymers and polymeric compositions herein described can be modified in ways well known to the polymer art without departing from the sprit and scope of the subject invention. Thus, for example, stabilizers, antioxidants, slip agents, antiblocking agents, anti-fog agents, antistatic agents, dyes and pigments may be added in their usual quantities. Moreover, low density polyethylene coated biaxially oriented linear highly crystalline polyolefin films of this invention can be printed satisfactorily after suitable treatment of said films by methods known in the art, such as subjecting the film to the action of a corona discharge, flame treatment, ozone treatment, chlorination, etc.

The details of the manner of practicing the preferred embodiment of the invention will become apparent from the following examples, it being understood that the examples are illustrative thereof and that the scope of the invention is not restricted thereto.

EXAMPLES 1–4

A film-forming linear highly crystalline polypropylene and a low density polyethylene were simultaneously melt-extruded into concentric layers of seamless tubing as herein described and using apparatus illustrated in FIG. 1 and with the polypropylene forming the inner layer. The conditions under which extrusion was carried out are set forth in Table I. The flattened seamless tubing thereby formed was then passed through a heater as herein described and illustrated in FIG. 1. The heater raised the temperature of the inner linear highly crystalline polypropylene seamless tubular film to a temperature above about 130° C. and below its melting point of about 165° C. while heating the outer seamless tubular low density polyethylene coating to a temperature above about 130° C. and below about 165 C. Simultaneously, the seamless tubing was stretched to biaxially orient the inner linear highly crystalline polypropylene seamless tube by inflation of the seamless tubing between the lower and upper pairs of squeeze rolls 18 and 24, respectively, with air and by maintaining the lower and upper pairs of squeeze rolls at the different peripheral speeds set forth in Table I wherein there is also recorded the flat width and thickness of the processed seamless tubing. The physical properties of the low density polyethylene-coated biaxially oriented polypropylene film are recorded in Table II.

EXAMPLES 5–6

A film-forming linear highly crystalline polypropylene was simultaneously melt-extruded with low density polyethylene into concentric layers of seamless tubing under the conditions herein described and using apparatus as illustrated in FIG. 3, and with the polypropylene forming the middle layer and the lower density polyethylene forming the inner and outer layers. The conditions under which extrusions were carried out are set forth in Table I. The flattened seamless tubing thusly formed was then passed through a heater as herein described and illustrated in FIG. 3. The heater raised the temperature of the middle linear, highly crystalline polypropylene seamless tubular film to a temperature above about 130° C. and below its melting point of about 165° C. while heating the inner and outer seamless tubular low density polyethylene coatings to a temperature above 130° C. and below about 165° C. Simultaneously, the seamless tubing was stretched to biaxially orient the middle linear highly crystalline polypropylene seamless tubular film by inflating the seamless tubing between the lower and upper pairs of squeeze rolls at the different peripheral speeds set forth in Table I wherein there is also recorded the flat width and thickness of the processed seamless tubing.

TABLE I

| Example Number | Double Wall | | | | Triple Wall | |
|---|---|---|---|---|---|---|
| | 1 | 2 | 3 | 4 | 5 | 6 |
| Die inner diameter (inches) | 1.5 | 1.5 | 1.5 | 1.5 | 3.0 | 3.0 |
| Die orifice widths (in.): | | | | | | |
| Inside | 0.025 | 0.025 | 0.025 | 0.025 | 0.012 | 0.012 |
| Outside | 0.025 | 0.025 | 0.025 | 0.025 | 0.012 | 0.012 |
| Middle | | | | | 0.012 | 0.012 |
| Peripheral speed of lower squeeze rolls (feet per minute) | 4 | 4 | 4 | 4 | | |
| Extruder temperature (° F.): | | | | | | |
| Polyethylene | 360 | 360 | 360 | 360 | 360 | 370 |
| Polypropylene | 390 | 390 | 390 | 390 | 390 | 400 |
| Die Temperature (° F.) | 400 | 400 | 400 | 400 | 400–410 | 400–410 |
| Flat Width of Unoriented Film (inches) | 2⅝ | 2¾ | 2¾ | 2¹⁵⁄₁₆ | 3½ | 3⅓ |
| Thickness of Unoriented Tubing Layers (mils): | | | | | | |
| Inside film | 8–10 | 14–16 | 19–23 | 18–22 | 1.5–5 | 2–4 |
| Outside film | 2–5 | 2–4 | 2–4 | 2–4 | 0.4–8 | 1–4 |
| Middle film | | | | | 13–17 | 9–13 |
| Oriented film flat width (inches) | 13⅝ | 14⅜ | 15¼ | 14⅞ | 18½ | 16¼ |
| Thickness (mils) | 0.4–0.7 | 0.4–0.8 | 0.4–0.8 | 0–5–0.8 | 0.6–0.9 | 0.4–0.8 |
| Peripheral speed of squeeze rolls (feet per minute): | | | | | | |
| Lower | 4 | 4 | 4 | 4 | 4¼ | 4¼ |
| Upper | 20.5 | 21 | 21.5 | 21.5 | 22 | 26 |
| Draw Point (inches)¹ | 8 | 8 | 7 | 7 | | |
| Draw Ratio | 5 | 5 | 5 | 5 | | |

¹ Distance from top of heater at which point tube radially expands herein defined as the draw point.

TABLE II.—PROPERTIES OF ORIENTED POLYETHYLENE-COATED POLYPROPYLENE

| Example Number | 1 | 2 | 3 | 4 |
|---|---|---|---|---|
| Film thickness (mils) | 0.55 | 0.75 | 0.8 | 0.8 |
| Secant Modulus (pounds per sq./in.): | | | | |
| Machine Direction | 82,120 | 72,720 | 74,570 | 95,800 |
| Transverse Direction | 87,460 | 58,540 | 83,800 | 102,000 |
| Tensile Strength, Pounds Per Square Inch: | | | | |
| Machine Direction | 21,850 | 15,540 | 16,360 | 17,300 |
| Transverse Direction | 17,500 | 15,780 | 18,170 | 16,540 |
| Elongation at Break, percent: | | | | |
| Machine Direction | 144 | 146 | 159 | 129 |
| Transverse Direction | 117 | 85 | 92 | 122 |
| Tear Strength (grams): | | | | |
| Machine Direction | 8 | 5 | 4 | 4 |
| Transverse Direction | 8 | 4 | 3 | 5 |
| Haze (percent) | 4.1 | 6.2 | 8.1 | 12.6 |
| Gloss (45° angle) | 60 | 61 | 47 | 41 |
| Moisture Vapor Transmission (grams/100 inches squared/24 hour/mil) | 0.76 | 0.55 | 0.47 | 0.49 |
| Oxygen transmission (cubic centimeters/100 inches squared/24 hour/mil) | 261 | 240 | 233 | 256 |
| Shrinkage (percent): | | | | |
| 90° C.: | | | | |
| Machine Direction | 2.0 | 1.0 | 1.3 | 2.3 |
| Transverse Direction | 3.7 | 3.0 | 3.7 | 3.7 |
| 100° C.: | | | | |
| Machine Direction | 4.3 | 1.3 | 2.7 | 2.3 |
| Transverse Direction | 6.7 | 7.0 | 5.7 | 7.0 |

In the foregoing Examples 1-6 it was found that the low density polyethylene coating(s) readily separated from the unoriented linear highly crystalline polypropylene film, whereas the coating(s) excellently adhered to the biaxially oriented linear highly crystalline polypropylene film.

The heat-sealing range of the low density polyethylene coating of the multi-wall film of the examples is about 230° F. to 300° F., and the heat-sealing range of the biaxially oriented linear highly crystalline polypropylene film of the example is about 325° F. to 400° F. Thus, a package can be formed of the multi-wall film without puckering or shrinkage of said biaxially oriented polypropylene film by contacting the low density polyethylene coatings to each other and heat-sealing the multi-wall film together at the lower heat sealing temperatures required for low density polyethylene by any of the well-known heat-sealing techniques. For example, rectangularly shaped samples were cut from each of the low density polyethylene coated biaxially oriented polypropylene films of Examples 1-4, the cuts being made 10 inches in the machine direction by 8 inches in the transverse direction. The cut sheets were folded in half so that the low density polyethylene coated side was in contact with itself. Short dwell bar sealing was then used to transversely heat-seal each coated sample together, employing an electronic impulse type sealer in contact with the folded sample under the following conditions; ½ second dwell time, 20 pounds per square inch air pressure, sealing temperatures of 250° F., 275° F. and 300° F. The bar seal pressure for each of the samples of the Examples 1-4 is set forth in Table III.

TABLE III

| | Examples | | | |
|---|---|---|---|---|
| | 1 | 2 | 3 | 4 |
| Bar Heat Seal (pounds per square inch): | | | | |
| 250° F | 2.9 | 4.5 | 5.0 | 4.8 |
| 275° F | 2.7 | 4.7 | 5.0 | 5.0 |
| 300° F | 3.7 | 4.5 | 5.0 | 5.0 |

The foregoing heat-sealed samples did not shrink or pucker.

Among the advantages of the multi-wall films of the present invention are that the desirable properties of biaxially oriented linear highly crystalline polyolefin, and particularly polypropylene film, such as high tensile strength, high modulus of elasticity, excellent optical properties, excellent gas barrier properties, low temperature flexibility, etc. are combined with the desirable properties of low density polyethylene, namely, gool moisture-vapor barrier, lower heat-sealing temperatures and anti-blocking properties at high humidities. Such combination of these many desirable film properties make the multi-wall film of the present invention ideally suited as a packaging film for foodstuffs and other commodities.

The following is a glossary of terms employed throughout the present specification.

Density—is measured in grams per cubic centimeter in a gradient column made up of water, methanol and sodium acetate at 25° C.

Gloss—reflectance in the specular direction measured within a narrow reflectance angle (45°).

Intrinsic viscosity—is measured in deciliters per gram as described by ASTM Test D1601–58T which has been modified to be conducted at 135° C.

Melt Index—ASTM Test D1238–52T; ASTM Standards, 1952, Part 6, page 735. The flow rate is rate of extrusion in grams per 10 minutes at 230° C. (unless otherwise explicitly indicated).

Decomposition or degradation temperature—temperature at which a polymeric material will break down or be converted into a substance containing a smaller number of carbon atoms.

Secant modulus—the stress divided by stain at 1% elongation calculated on a straight line from the point of origin.

Tensile strength—ASTM D882, D638. Tensile Strength is expressed in pounds per square inch.

Elongation at break—ASTM D882, D638. Elongation is expressed in percent.

Tear strength—Elmendorf. Tear strength expressed in grams.

Haze—Hazemeter, ASTM D1003 Haze expressed in percent.

Gloss—Photovolts at 45° angle; ASTM D523 at 60° angle; TAPPI-48 M-51 at 75° angle.

Moisture vapor transmission— ASTM E–96–53 T or General Foods @ 90–95%; R.H. and 100° F.; moisture vapor transmission is expressed in grams/100 inches square/24 hour/mil.

Oxygen Transmission—ASTM D–1434–58. Oxygen transmission expressed in cubic centimeters/100 inches squared/24 hour/mil.

Isotactic content and atactic content—polypropylene herein used were measured by the infra-red method described in vol. 3, page 302 of the 1960 issue of the Journal of Applied Polymer Science.

Olefin polymer—denotes normally solid homopolymers of alpha mono-olefinically unsaturated hydrocarbons as well as normally solid copolymers thereof, with one or more other organic compounds copolymerizable therewith which contain polymer producing unsaturation, such as is present for example in carbon monoxide and formaldehyde and in compounds containing the ethylene linkage $>C=C<$ e.g. styrene, vinyl stearate, butene, vinyl acetate, vinyl formate, methyl acrylate, monobutyl maleate, 2-ethyl hexyl acrylate, N-methyl-N-vinyl acetamide, acrylic acid, ethyl acrylate, methacrylic acid, isoprene, butadiene, acrylamide, vinyl triethoxysilane, bicycloheptene, bicycloheptadiene, divinyl phosphonate and the like. Many other copolymerizable monomers which can be used in addition to these illustrative compounds are well known in the art.

It will be obvious to those skilled in the art that various changes and modifications may be made in the foregoing description without departing from the spirit and nature of the present invention.

What is claimed is:

1. A coated film comprising a biaxially oriented linear highly crystalline polyolefin film, and a polyolefin coating bonded to at least one surface thereof, said coating having been applied to said crystalline film prior to orientation and maintained at a temperature above its melting point during orientation of said crystalline film, said polyolefin coating being heat-sealable to itself at a temperature below the temperature at which shrinkage and puckering of the biaxially oriented linear highly crystalline polyolefin film occurs and having a melting point of at least about 5° C. below the melting point of the highly crystalline polyolefin film.

2. A coated film according to claim 1 wherein the highly crystalline polyolefin film is polypropylene.

3. The coated film according to claim 1 wherein the polyolefin coating is low density polyethylene.

4. A coated film according to claim 1 wherein the highly crystalline polyolefin film is polypropylene and the polyolefin coating is polyethylene.

5. The coated film according to claim 4, wherein both surfaces of the biaxially oriented linear highly crystalline polypropylene film are coated with low density polyethylene.

6. A coated film according to claim 1 wherein the polyolefin coating has a melting point of about 20 to about 90° C. below the melting point of the highly crystalline polyolefin film.

7. A coated film according to claim 1 which is in the form of a tubing.

(References on following page)

References Cited

UNITED STATES PATENTS

| | | | |
|---|---|---|---|
| 3,022,543 | 2/1962 | Baird et al. | 264—95 |
| 3,260,776 | 7/1966 | Lindstrom et al. | 117—138.8 |
| 3,294,621 | 12/1966 | Baird et al. | 161—252 |
| 2,932,323 | 4/1960 | Aries | 156—244 |
| 2,956,723 | 10/1960 | Tritsch | 156—244 |
| 3,068,516 | 12/1962 | Hofer | 264—95 |
| 3,187,982 | 6/1965 | Underwood et al. | 264—95 |

FOREIGN PATENTS 589,517  12/1959  Canada.

ROBERT F. BURNETT, Primary Examiner

R. J. ROCHE, Assistant Examiner

U.S. Cl. X.R.

117—138.8; 161—252, 402; 264—95, 173, 210